United States Patent
Everitt et al.

(10) Patent No.: US 9,489,767 B1
(45) Date of Patent: Nov. 8, 2016

(54) CULL STREAMS FOR FINE-GRAINED RENDERING PREDICATION

(75) Inventors: Cass W. Everitt, Round Rock, TX (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1563 days.

(21) Appl. No.: 11/956,306

(22) Filed: Dec. 13, 2007

(51) Int. Cl.
  *G06T 15/40* (2011.01)
  *G06T 15/80* (2011.01)

(52) U.S. Cl.
  CPC ............ *G06T 15/40* (2013.01); *G06T 15/405* (2013.01); *G06T 15/80* (2013.01)

(58) Field of Classification Search
  None
  See application file for complete search history.

(56) References Cited

U.S. PATENT DOCUMENTS

| | | | |
|---|---|---|---|
| 5,898,437 A * | 4/1999 | Deolaliker | 345/421 |
| 6,697,063 B1 | 2/2004 | Zhu | |
| 7,847,798 B1 | 12/2010 | Parenteau et al. | |
| 2004/0130552 A1 * | 7/2004 | Duluk et al. | 345/506 |
| 2005/0128203 A1 | 6/2005 | Huang et al. | |
| 2006/0164414 A1 * | 7/2006 | Farinelli | 345/422 |

FOREIGN PATENT DOCUMENTS

EP 0731424 A1 11/1996

OTHER PUBLICATIONS

Office Action in U.S. Appl. No. 11/956,309, mailed Jan. 20, 2011.

* cited by examiner

*Primary Examiner* — Maurice L McDowell, Jr.
(74) *Attorney, Agent, or Firm* — Artegis Law Group, LLP (57) ABSTRACT

One embodiment of the present invention sets forth a technique to perform fine-grained rendering predication using an IGPU and a DGPU. A graphics driver divides a 3D object into batches of triangles. The IGPU processes each batch of triangles through a modified rendering pipeline to determine if the batch is culled. The IGPU writes bits into a bitstream corresponding to the visibility of the batches. The DGPU reads bits from the bitstream and performs full-blown rendering, including shading, but only on the batches of triangles whose bit indicates that the batch is visible. Advantageously, this approach to rendering predication provides fine-grained culling without adding unnecessary overhead, thereby optimizing both hardware resources and performance.

20 Claims, 5 Drawing Sheets

CULL STREAMS FOR FINE-GRAINED RENDERING PREDICATION

BACKGROUND OF THE INVENTION

1. Field of the Invention

The present invention relates generally to the field of graphics processing and more specifically to a system and method for using cull streams for fine-grained rendering predication.

2. Description of the Related Art

A typical computing system includes a central processing unit (CPU) and a graphics processing unit (GPU). Some GPUs are capable of very high performance using a relatively large number of small, parallel execution threads on dedicated programmable hardware processing units. The specialized design of such GPUs usually allows these GPUs to perform certain tasks, such as rendering three-dimensional (3D) scenes, much faster than a CPU. However, the specialized design of these GPUs also limits the types of tasks that the GPU can perform. The CPU is typically a more general-purpose processing unit and therefore can perform most tasks. Consequently, the CPU usually executes the overall structure of the software application and configures the GPU to perform specific tasks in a graphics pipeline.

One task that may be performed when transforming 3D scenes into two-dimensional (2D) images is culling. In a typical graphics scene, a substantial percentage of the graphics primitives sent by the application to the GPU produce no effect in the image being rendered. Some primitives may not be inside the view volume, some primitives may be back-facing, and some primitives may be occluded by other primitives. Typically, more than 60% of the primitives fall into one of the above categories. Culling the scene is thus employed to minimize the burden on the processor and to eliminate unnecessary rendering of primitives that are not visible. In a typical GPU, this work is eliminated as early as possible, but culling necessarily consumes some processing time and results in bubbles in the GPU work flow that reduce overall processing efficiency.

One type of culling technique is occlusion culling, where the GPU determines how many primitives of an object pass a Z-test and a stencil test. One drawback of this approach is that the GPU must transmit the results of these tests back to the CPU, which is ahead in the command stream relative to the GPU.

To overcome this drawback, the technique of predicated rendering (conditional rendering) was introduced. In predicated rendering, the result of an occlusion query with respect to one object is used to predicate rendering of some other object. For example, the CPU may render a bounding volume of a 3D object, and if any part of the bounding volume passes both the Z-test and stencil test (i.e., part of the bounding volume is visible), then the actual 3D object is rendered by the GPU. If no samples of the bounding volume pass both the Z-test and the stencil test, then the 3D object is not rendered. The bounding volume of the object is the "predicate" for the predicated rendering operation.

Although predicated rendering functions as intended, this technique has a significant limitation in that an occlusion query provides only one bit of information to the system—whether or not the entire 3D object is occluded. Developers and designers are increasingly creating larger and more complex objects that are to be rendered with a single draw call or only a few draw calls. Because of the complexity of the objects, the results of predicated rendering are very coarse. For example, if an object contains 1000 primitives, and only one primitive is visible, then the entire 3D object is rendered because the occlusion query provides only one bit of information—whether or not any part of the 3D object, no matter how little, is visible. If the coarseness of occlusion culling ultimately results in most or all of the 3D objects in a graphics scene being deemed visible, then occlusion culling does nothing more than add cost via a more complicated command stream with no corresponding benefit to the overall performance. In addition, if a portion of the bounding volume of an object is visible, but none of the object is visible, then the full object would be rendered, although none of the object is visible, because the object's bounding volume is visible.

In an attempt to overcome the limitations of predicated rendering, smaller, sub-bounding volumes of the overall bounding volume of the 3D object may be used. With such an approach, each sub-bounding volume is queried for culling, and only the subparts of the 3D object that are visible are rendered. Although using sub-bounding volumes results in finer granularity, additional overhead is required to generate and render each of the sub-bounding volumes, thereby decreasing overall performance. Furthermore, similar to above, a portion of a sub-bounding volume may pass the culling query, causing subparts of the object to be rendered, although none of the subparts of the object are visible.

Accordingly, there remains the need in the art for a finer-grained predicated rendering technique that does not add costly overhead to the command stream.

SUMMARY OF THE INVENTION

In embodiment of the invention provides for a graphics system configured to perform fine-grained rendering predication that includes an integrated graphics processing unit configured to process batches of triangles associated with a graphics object through a first rendering pipeline and, for each batch, to determine whether the batch of triangles is culled and to write a bit into a bitstream to indicate whether the batch of triangles is culled, and a discrete graphics processing unit configured to read a first bit from the bitstream corresponding to a first batch of triangles and to process the first batch of triangles through a second rendering pipeline if the first bit indicates the first batch of triangles is not to be culled.

Another embodiment of the invention provides for a method for fine-grained rendering predication that includes the steps of receiving a batch of triangles associated with a graphics object, assembling vertex data related to each triangle in the batch of triangles, processing the batch of triangles based on the vertex data to determine if the batch of triangles is to be culled, and writing a bit into a bitstream indicating whether the batch of triangles is to be culled.

Yet another embodiment of the invention provides for a method for fine-grained rendering predication that includes the steps of dividing a graphics object into one or more batches of triangles, and generating a command buffer that includes one or more instructions in a plurality of instructions to be executed by an integrated graphics processing unit that cause the integrated graphics processing unit to process a first batch of triangles through a first graphics rendering pipeline to determine whether the first batch of triangles is to be culled, and write a first bit into a bitstream that indicates whether the first batch of triangles is to be culled.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. The appended drawings illustrate only typical embodiments of this invention and are therefore not to be considered limiting of its scope, for the invention may admit to other equally effective embodiments.

DETAILED DESCRIPTION

Figure 1:
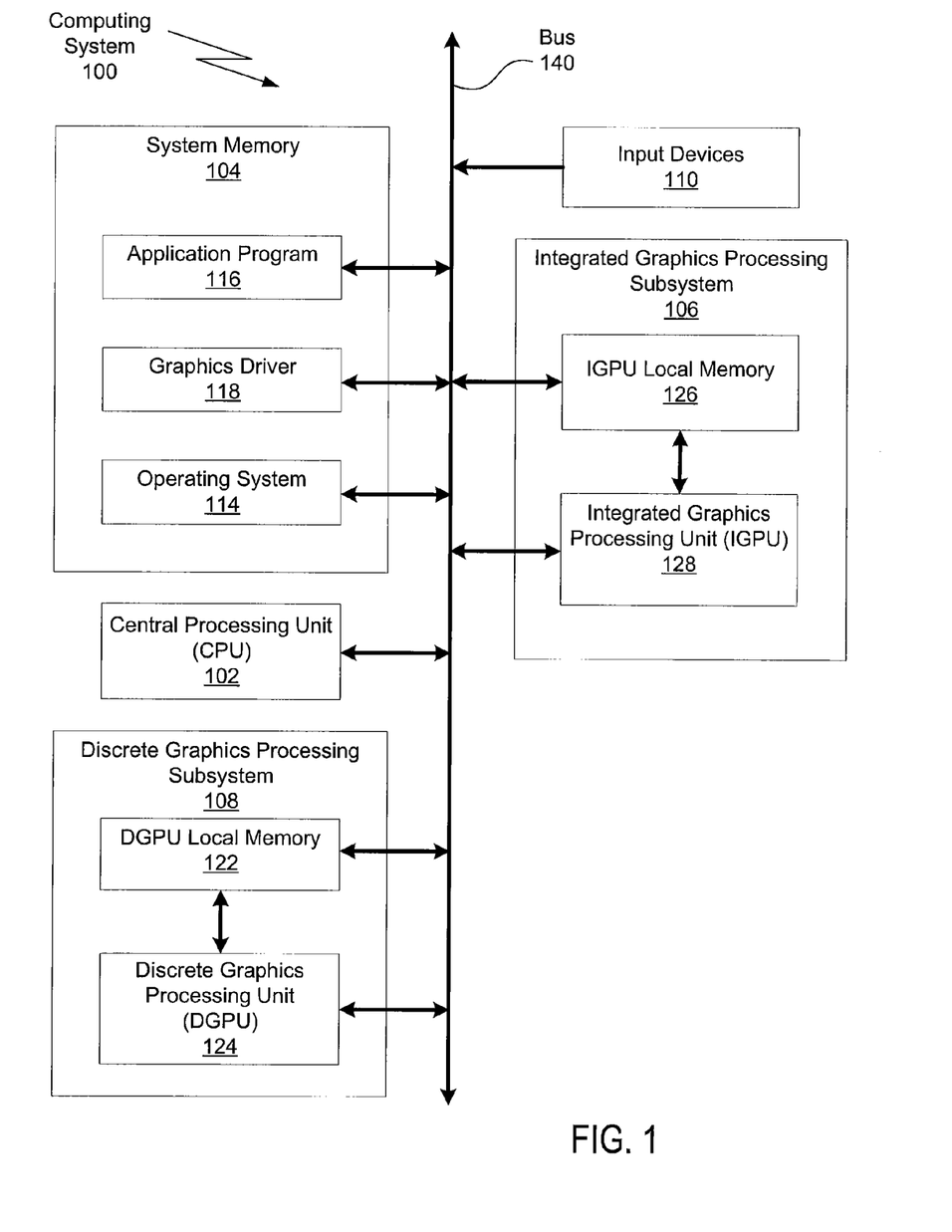
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a central processing unit (CPU) 102, input devices 110, a system memory 104, an integrated graphics processing subsystem 106, and a discrete graphics processing system 108. In alternate embodiments, the CPU 102 and portions of the integrated graphics processing subsystem 106 may be integrated into a single processing unit. Communication paths interconnecting the various components in FIG. 1 may be implemented using any suitable bus or point-to-point communication protocol(s), and connections between different devices may use different protocols as is known in the art.

The CPU 102 connects to the input devices 110, the system memory 104, the integrated graphics processing subsystem 106, and the discrete graphics processing subsystem 108 via a bus 140. The CPU 102 receives user input from the input devices 110, executes programming instructions stored in the system memory 104, operates on data stored in the system memory 104, and configures either the integrated graphics processing subsystem 106 or the discrete graphics processing subsystem 108 to perform specific tasks in a graphics pipeline. In alternate embodiments, the CPU 102 may configure the integrated graphics processing subsystem 106 and the discrete graphics processing subsystem 108 to work together to perform specific tasks.

The system memory 104 typically includes dynamic random access memory (DRAM) used to store programming instructions and data for processing by the CPU 102, the integrated graphics processing subsystem 106, and the discrete graphics processing subsystem 108. The integrated graphics processing subsystem 106 and the discrete graphics processing subsystem 108 receive instructions transmitted by the CPU 102 and process the instructions in order to render graphics images.

The system memory 104 includes an operating system (OS) 114, one or more application programs 116, and a graphics driver 118. The operating system 114 is typically the master control program of the computing system 100. Among other things, the operating system 114 manages the resources of the computing system 100, such as the system memory 104, and forms a software platform on top of which the application program(s) 116 may run. The application program 116 transmits instructions that are designed to operate within the integrated graphics processing subsystem 106, the discrete graphics processing subsystem 108, or both, to the graphics driver 118. The graphics driver 118 is configured to translate these instructions into machine code programs that execute on components within the integrated graphics processing subsystem 106 and the discrete graphics processing subsystem 108.

The integrated graphics processing subsystem 106 includes an integrated graphics processing unit (IGPU) 128 and an IGPU local memory 126. In one embodiment, the IGPU 128 is part of the main chipset that is wired into the motherboard of the computing system 100. As described in greater detail below in FIGS. 3-5, the IGPU 128 may receive instructions transmitted from the graphics driver 118, process the instructions in order to determine if batches of triangles associated with a graphics object should be culled, and store bits into a bitstream in the system memory 104 indicating whether the different batches of triangles should be culled. The IGPU 128 may be provided with any amount of IGPU local memory 126 and may use both IGPU local memory 126 and system memory 104. Further, in alternative embodiments, the IGPU local memory 126 may be incorporated into the system memory 104.

The computing system 100 also includes the discrete graphics processing subsystem 108. The discrete graphics processing subsystem 108 includes a discrete graphics processing unit (DGPU) 124 and a DGPU local memory 122. The discrete graphics processing subsystem 108 may be part of a discrete graphics card that is connected to the motherboard of the computing system 100 via an expansion slot (e.g., PCI Express or Accelerated Graphics Port). The discrete graphics processing subsystem 108 may have higher performance and a richer graphics feature set than the integrated processing subsystem 106, but consumes more power. The DGPU 124 may receive instructions transmitted from the graphics driver 118, process the instructions in order to render graphics images, and store the graphics images in the DGPU local memory 122 or system memory 104. Again, as described in more detail below in FIGS. 3-5, the DGPU 124 reads the bitstream stored in system memory 104 indicating whether the batch of triangles associated with the graphics object should be culled, and renders a batch of triangles if the corresponding bit in the bitstream indicates that the batch of triangles should not be culled. The DGPU 124 may be provided with any amount of DGPU local memory 122 and may use both the DGPU local memory 122 and system memory 104.

Figure 2:
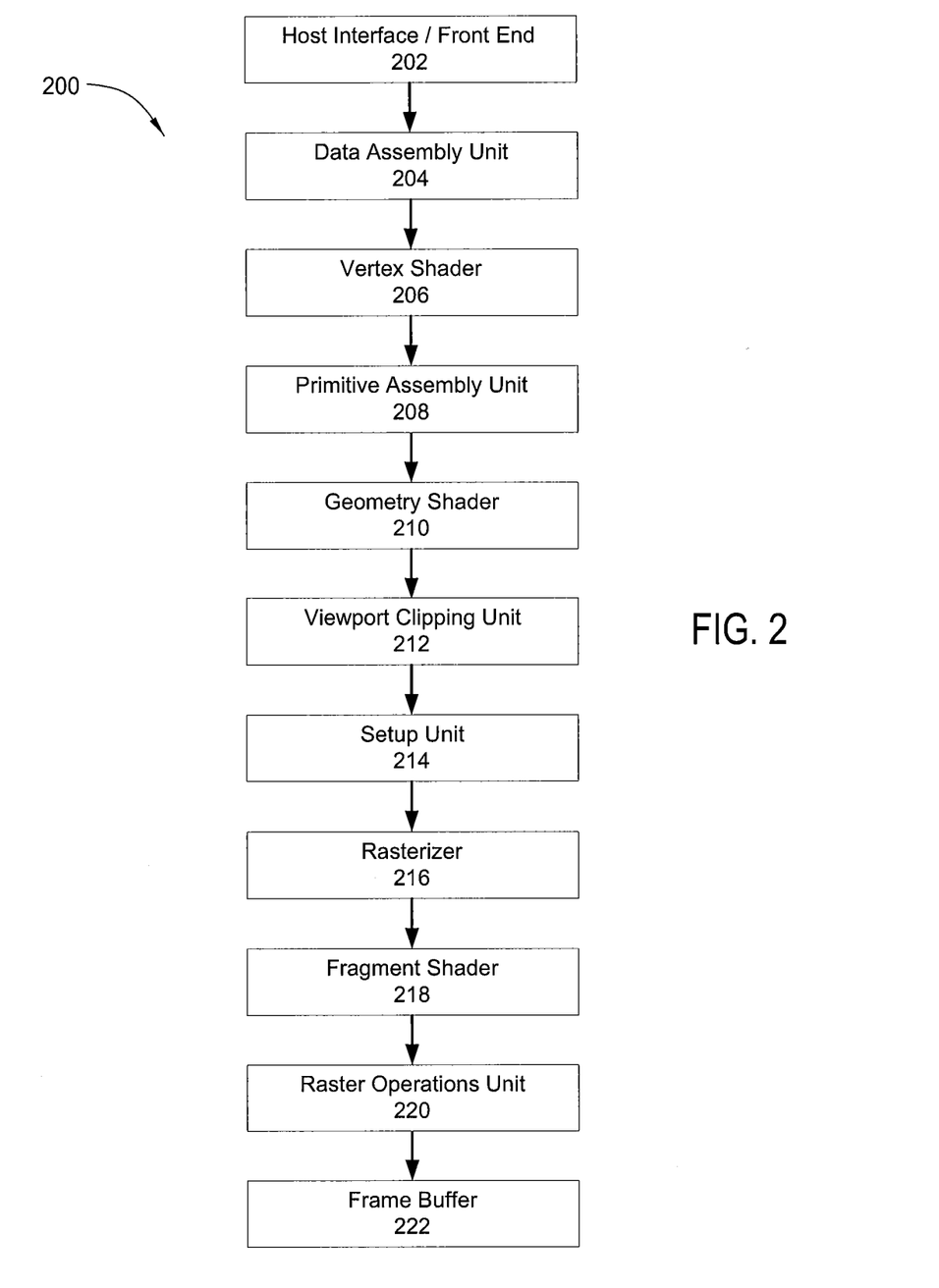
FIG. 2 is a conceptual diagram of a programmable graphics pipeline residing within the discrete graphics processing unit of FIG. 1, according to one embodiment of the invention.

FIG. 2 is a conceptual diagram of a programmable graphics pipeline 200 residing within the DGPU 124 of FIG. 1, according to one embodiment of the invention. The graphics pipeline 200 is configured to transform 3-D scenes into 2-D images. As shown, the graphics pipeline 200 includes a host interface/front end 202, data assembly unit 204, a vertex shader 206, a primitive assembly unit 208, a geometry shader 210, a viewport clipping unit 212, a setup unit 214, a rasterizer 216, a fragment shader 218, a raster operations unit 220, and a frame buffer 222.

The host interface/front end 202 receives raw information from the CPU 102 that is running the application program 116 stored in system memory 104. The host interface/front end 202 buffers input information and supplies that information to the data assembly unit 204.

The data assembly unit 204 is a fixed-function unit that collects vertex data from the application program 116 for high-order surfaces, primitives, and the like, and passes the vertex data to the vertex shader 206. The data assembly unit 204 may gather data from buffers stored within system memory 104 or DGPU local memory 122, as well as from API calls from the application program 116 used to specify vertex attributes. The vertex shader 206 is a programmable execution unit that is configured to execute a machine code vertex shading program, processing vertex data as specified by the vertex shading program. For example, the vertex shader 204 may be programmed to perform skinning operations, transform the vertex data from an object-based coordinate representation (object space) to an alternatively based coordinate system such as world space or normalized device coordinates (NDC) space, or any combination thereof.

The primitive assembly unit 208 is a fixed-function unit that receives processed vertex data from vertex shader 206 and constructs primitives, e.g., points, lines, triangles, or the like, for processing by the geometry shader 210. The constructed primitives may include a series of one or more vertices, each of which may be shared amongst multiple primitives, and state information, such as a primitive identifier, defining the primitive. In alternative embodiments, a second primitive assembler (not shown) may be included subsequent to the geometry shader 208 in the data flow through the DGPU 124.

The geometry shader 210 is a programmable execution unit that is configured to execute a machine code geometry shading program, processing primitives received from the primitive assembly unit 208 as specified by the geometry shading program. The geometry shader 210 may traverse the vertices of a given primitive, using the state information associated with the primitive to operate on those vertices. For example, the geometry shader 210 may be configured to traverse the vertices of an input primitive, using the state information of the primitive, to construct object-space to texture-space mappings and to transform the object-space view vector and light vectors of each vertex of the primitive to texture-space equivalents. In addition to well-known per-primitive operations such as clipping, the geometry shader 210 may be programmed to generate one or more new graphics primitives and calculate per-vertex parameters for generated vertices that are used when the new graphics primitives are rasterized.

The viewport clipping unit 212 is a programmable execution unit that is configured to perform viewport transformations, viewport clipping, matrix translation to screen space, and the like. The viewport clipping unit 212 outputs further processed vertex data to a setup unit 214. The setup unit 214 performs derivative computations, culling, and the like and generates processed and filtered vertex data as described further herein. The setup unit 214 also determines location vertex data that is optionally written to in local memory. The setup unit 214 outputs the processed and filtered vertex data and corresponding indices to the rasterizer 216.

The rasterizer 216 is a fixed-function unit that scans the primitives and outputs fragments and coverage data to the fragment shader 218. The fragment shader 218 is a programmable execution unit that is configured to execute a machine code fragment shading program, processing fragments received from rasterizer 216 as specified by the machine code fragment shading program. The fragment shader 218 may be programmed to perform operations such as bump mapping, perspective correction, shading, blending, and the like, to produce shaded fragments that are output to the raster operations unit 220. The fragment shading engine 218 may access data that is stored in the DGPU local memory 122. The raster operations unit 220 optionally performs fixed-function computations such as near and far plane clipping and raster operations, such as the stencil test, the Z-test, blending and the like, and outputs pixel data as processed graphics data for storage in a buffer in the local memory, such as the frame buffer 220.

Figure 3:
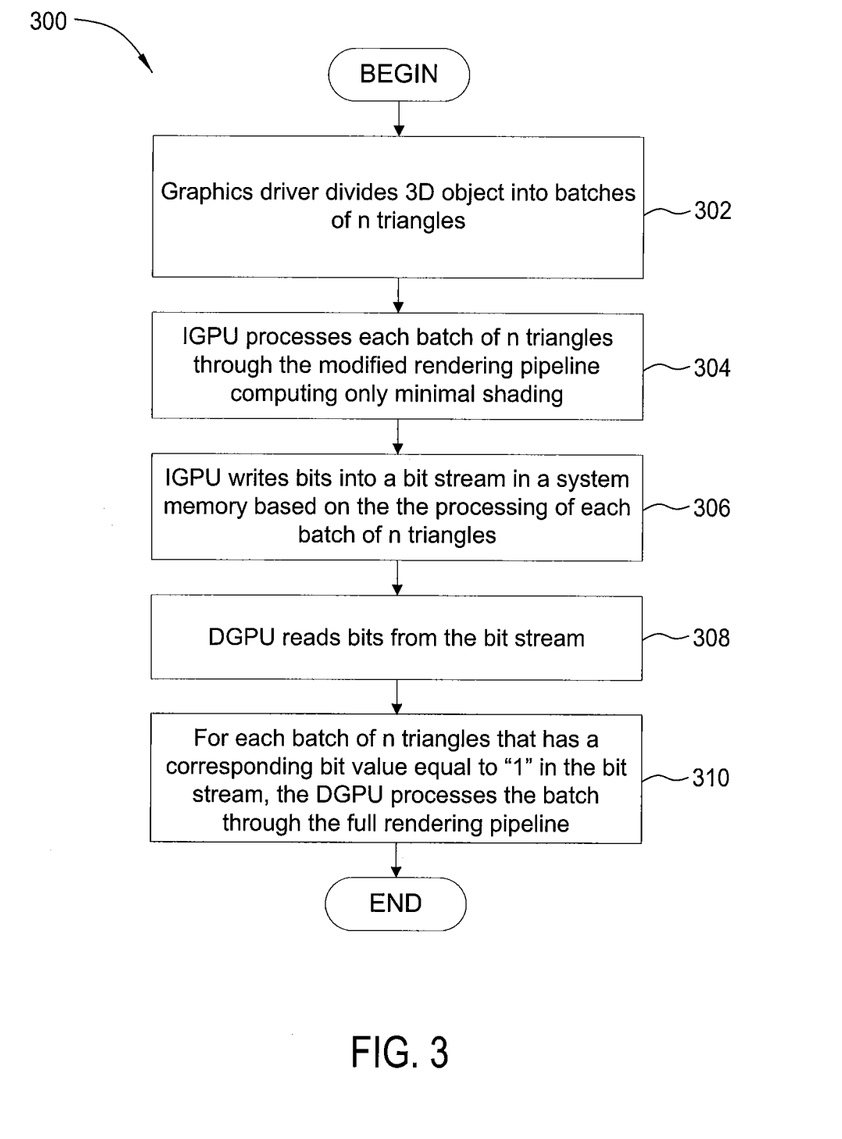
FIG. 3 is a flow diagram of method steps for performing fine-grained predicated rendering, according to one embodiment of the invention.

FIG. 3 is a flow diagram of method steps for performing fine-grained predicated rendering, according to one embodiment of the invention. Persons skilled in the art will understand that even though the method is described in conjunction with the systems of FIGS. 1, 2, and 4, any system configured to perform the steps, in any order, is within the scope of the present invention.

At step 302, the graphics driver divides a 3D graphics object being rendered into batches of n triangles. A value of "n" can be any positive integer. When n=1, then each batch size is equal to a single triangle. In one embodiment, the object may be divided into a fixed number of batches equal to the length of a finite bitstream written into system memory 104 by the IGPU 128 and read from system memory 104 by the DGPU 124. For example, if the bitstream produced by the IGPU 128 includes 64 bits, then each object is divided into 64 batches of n triangles.

Implementing the bitstream as a fixed length bitstream, rather than as an arbitrarily-long bitstream, may be useful relative to implementing embodiments of the invention into existing hardware. For example, existing hardware may already support a 64-bit payload; thus, incorporating a 64-bit bitstream would not require major modifications to that hardware.

At step 304, the IPGU 128 processes each batch of n triangles through a modified rendering pipeline configured to perform only a minimal amount of shading. As is well-known, shading is usually the most computationally expensive task in the rendering pipeline. Thus, the rendering pipeline of the IPGU 128 is configured to perform only the tasks required to determine if a given batch of n triangles should be culled. For example, the vertex shader may be programmed to execute only to the extent of determining position information. The modified vertex shader does not need to access attributes that do not contribute to position. Similarly, the geometry shader and fragment shader may be modified to execute only to the extent of determining visibility. For example, the geometry shader generally takes as an input a single primitive and outputs zero or more primitives. Outputting zero primitives indicates that the input primitive is effectively culled. Other stages of the rendering pipeline within the IGPU 128 may also be modified, as explained below in FIG. 4.

Furthermore, at step 304, the IPGU determines which batches of n triangles can be culled from the scene. For example, if a batch of n triangles fails any of the viewport clipping test, the back-face culling test, the Z-test, the stencil test, the zero area triangle test, or other type of culling test, then the batch can be culled from the scene. At step 306, the IGPU 128 writes bits into a bitstream based on the processing of each batch of n triangles through the modified rendering pipeline. In one embodiment, a bit value equal to "0" is written into the bitstream when a determination is made that a batch of n triangles can be culled from the scene, and a bit value equal to "1" is written into the bitstream when a batch is visible and, therefore, not culled. In one embodiment, the IGPU 128 writes the bitstream into system memory 104. In other embodiments, the bitstream may be written into any other technically feasible memory space or region.

At step 308, the DGPU 124 reads bits from the bitstream. At step 310, the DGPU 124 processes each batch of n triangles through the graphics rendering pipeline 200 that has a corresponding bit value in the bitstream indicating that the batch of n triangles does not get culled (e.g., a bit value equal to "1"). Each batch of n triangles that has a corresponding bit value in the bitstream indicating that the batch of n triangles is to be culled (e.g., a bit value equal to "0") is not rendered by the DGPU 124. Consequently, the DGPU 124 does render batches of triangles determined to be not visible since these batches are culled. If a batch of triangles is rendered (not culled), then the DGPU 124 processes the batch through the graphics rendering pipeline 200 where conventional shading is performed, including pixel shading. As described above, if a batch of triangles is culled, conventional shading should not be performed on the batch of triangles by the DGPU 124 because conventional shading is computationally expensive. Therefore, determining in the IGPU 128 which batches of triangles can be culled while performing minimal shading avoids expensive conventional shading of those batches of triangles in the DGPU 124. This approach to rendering predication provides fine-grained culling without adding unnecessary overhead, thereby optimizing both hardware resources and performance.

In one embodiment, the IGPU 128 performs step 304 one frame ahead of the frame on which DGPU 124 performs step 310. For example, the IGPU 128 and the DGPU 124 may be processing frames through their respective pipelines simultaneously. The IGPU 128 may be processing, at step 304, a first frame and the DGPU 124 may be simultaneously processing, at step 310, a second frame that is one frame ahead in time of the first frame. In this manner, the IGPU 128 stays ahead of the DGPU 124, thereby streamlining the rendering process so that the overhead associated with rendering predication is substantially reduced.

Figure 5:
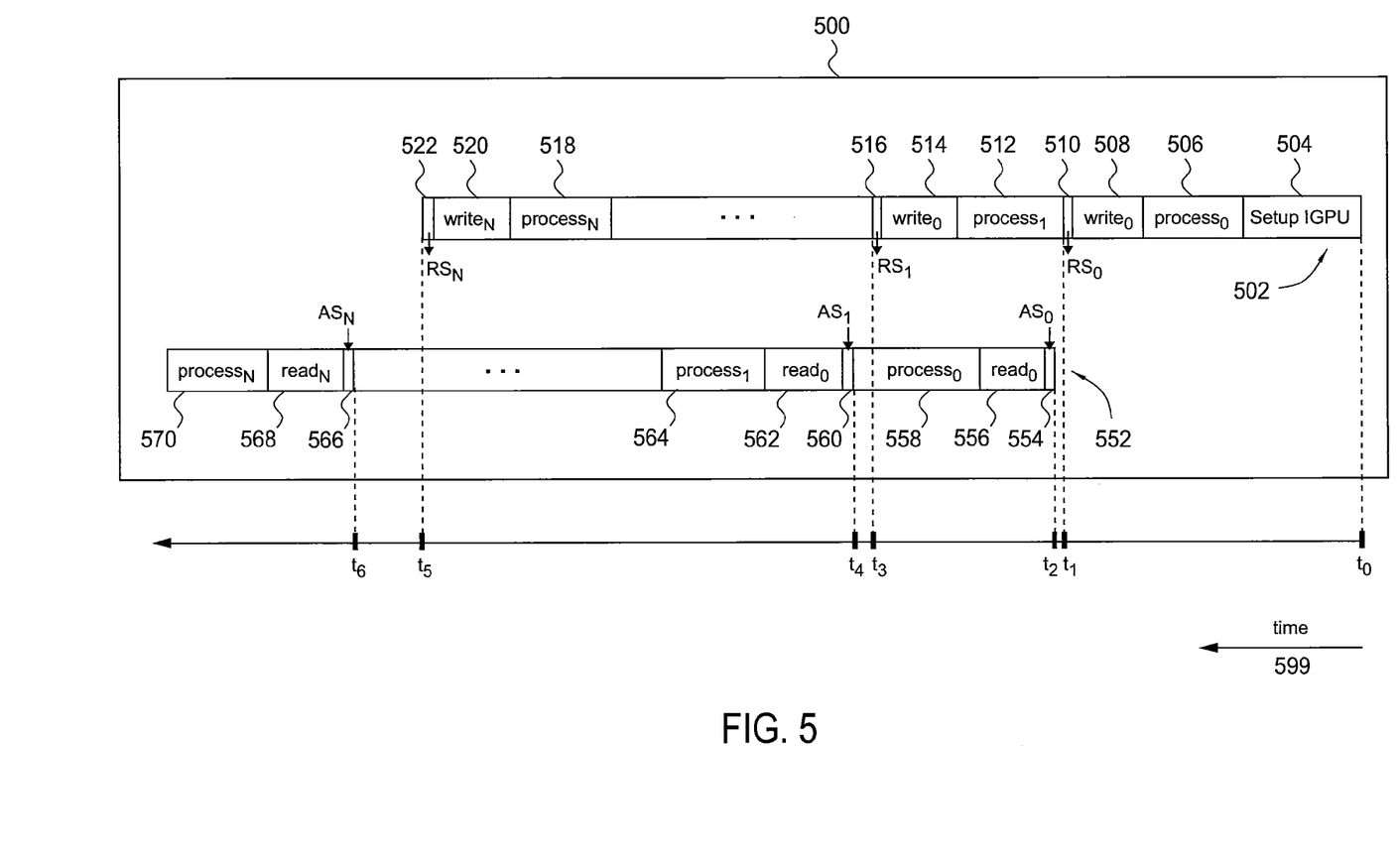
FIG. 5 is a conceptual diagram of a push buffer showing commands executed for performing fine-grained predicated rendering, according to one embodiment of the invention.

In one embodiment, as described in greater detail in FIG. 5, software techniques involving semaphores can be implemented to ensure synchronization between the IGPU 128 and the DGPU 124. For example, the IGPU 128 may release a semaphore as soon as the IPGU 128 finishes processing a frame. The DGPU 124 then waits to receive the semaphore before processing that frame through the graphics rendering pipeline 200.

In another embodiment, the bitstream may be initialized with all "1 s" for a conservative approach to rendering. Thus, if the IGPU 128 has not had enough time to finish processing a particular frame to determine which batches should be culled, then the DGPU 124 will simply proceed to render the batch. Initializing the bitstream in this fashion ensures that all visible batches are always rendered, although some non-visible batches may also be rendered on occasion as well.

Figure 4:
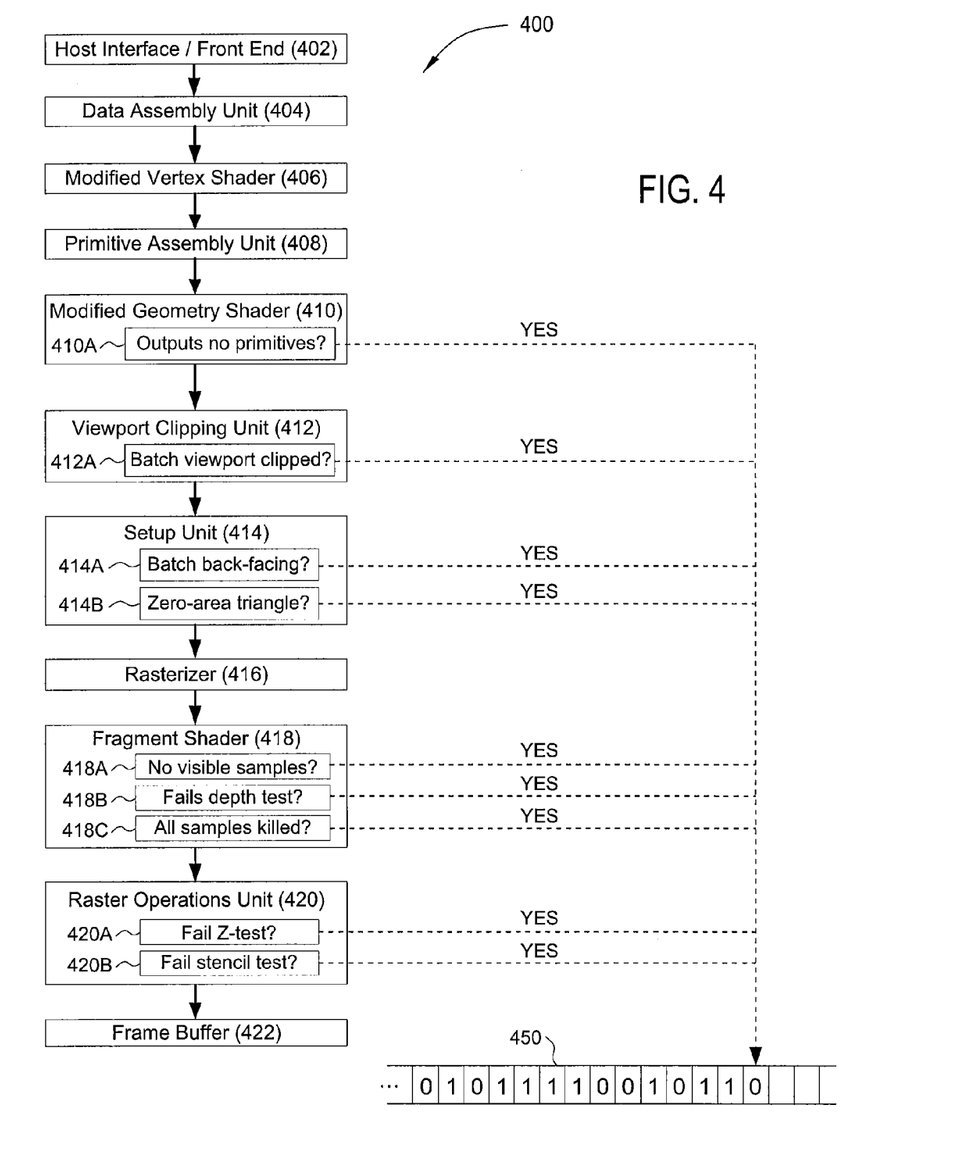
FIG. 4 is a conceptual diagram of a modified rendering pipeline within the integrated graphics processing unit of FIG. 1 that is configured to make culling determinations for different batches of triangles, according to one embodiment of the invention.

FIG. 4 is a conceptual diagram of a modified rendering pipeline 400 within the IGPU 128 that is configured to make culling determinations for different batches of n triangles, according to one embodiment of the invention. The rendering pipeline 400 is similar to rendering pipeline 200 of FIG. 2, but various functional elements within rendering pipeline 400 are modified in order to implement various aspects of the present invention. As described above, the IGPU 128 processes batches of n triangles to determine if the batches should be culled from the scene. In order for the IGPU 128 to stay ahead in time of the DGPU 124, the rendering pipeline 400 is modified to minimize the amount of shading.

Again, as is well-known, shading operations are generally the most computationally expensive operations in the rendering pipeline. Therefore, by reducing the amount of shading that takes place in the rendering pipeline 400, the IGPU 128 is able to process a given frame faster than the DGPU 124, thereby enabling the IGPU 128 to "stay ahead" of the DGPU 124 with respect to processing frames.

For example, a modified vertex shader 406 may be programmed to execute only to the extent needed to determine position information. Thus, the modified vertex shader 406 does not access or process vertex information that does not contribute to position. Similarly, a modified geometry shader 410 generally takes as an input a single primitive and outputs zero or more primitives. Outputting zero primitives indicates that the input primitive is effectively culled. Additionally, the color or texture of a particular fragment is usually immaterial to the question of whether the fragment is visible. Thus, a modified fragment shader 418 may be configured to determine whether a particular sample is visible or fails a depth test, without performing any color- or texture-based shading. Persons skilled in the art will recognize that other stages of the rendering pipeline 400 may be modified in similar fashion to execute only to the extent necessary to produce information relevant to determining if a batch of n triangles should be culled.

As described above, the rendering pipeline 400 determines whether a batch of triangles may be culled and then writes a corresponding bit into a bitstream 450. There may be several stages of the modified rendering pipeline 400 at which a determination can be made that a particular batch of triangles should be culled and a corresponding "0" written into the bitstream 450. For example, at 410A, the modified geometry shader 410 may determine that zero primitives are output. At bit value of "0" may then be written into the bitstream 450 because the input primitive(s) do not contribute to the final rendered scene. At 412A, a viewport clipping unit 412 determine if a batch of triangles is clipped by the viewport. If the entire batch is outside the viewport, then the batch is not visible and, thus, should be culled. In such a scenario, the IPGU 128 writes a "0" into a bitstream 450 for that batch of triangles. At 414A, the setup unit 414 is configured to determine if a batch of triangles is back-facing. As is well-known, if the batch is back-facing, then the batch of triangles is facing away from a camera position of the viewport and is not visible. Thus, if the batch of triangles is back-facing, then the IPGU 128 writes a "0" into the bitstream 450 for that batch of triangles. At 414B, if a batch of triangles is associated with a zero area triangle, then the IGPU 128 writes a "0" into the bitstream 450 as well.

In alternative embodiments, further processing may be performed based on the surface in the Z-buffer (not shown) to identify additional batches of triangles that should be culled. Further culling results in finer-grained results, at the cost of added computation. For example, the modified fragment shader 418 may be configured to write a "0" into the bitstream 450 for a batch of triangles that produces no visible samples (at 418A), fails depth test (at 418B), or produces an alpha value that effectively renders all associated samples not visible (at 418 C). Likewise, in a raster operations unit 420, if a batch of triangles fails either the Z-test (at 422A) or the stencil test (at 422B), then the IPGU 128 writes a "0" into the bitstream 450 for that batch of triangles. Again, persons skilled in the art will recognize that other modifications made to rendering pipeline 400 to make culling decisions that can then be used by the DGPU 124 to avoid rendering batches of occluded or not visible triangles fall within the scope of the invention. In yet another embodiment, if the bit written into the bitstream indicates that the batch of triangles is to be culled, then further processing of the batch of triangles through other processing engines in the graphics rendering pipeline 400 is bypassed.

FIG. 5 is a conceptual diagram of a push buffer 500 showing commands executed for performing fine-grained predicated rendering, according to one embodiment of the invention. The push buffer 500 may be stored in system memory 104 and loaded into the IGPU 128 and the DGPU 124 to perform fine-grained predication operations. Also, device masks (not shown) toggle between the operations performed by the IGPU 128, reflected in command stream 502, and operations performed by the DGPU 124, reflected in command stream 552. In one embodiment, a two-bit device mask may be used to define GPU operation. For example, a first bit of the two-bit device mask may correspond to the IGPU 128 and a second bit of the two-bit device mask may correspond to the DGPU 124. When a bit of the device mask is "1," then the corresponding GPU performs the operations reflected in the subsequent commands in the push buffer 500. For example if the device mask has a value of "01," then the IGPU 128 is not operational, but the DGPU 124 is operational. Similarly, if the device mask has a value of "10," then the IGPU 128 is operational, but the DGPU 124 is not operational. If the device mask has a value of "11," then both CPUs are operational. If the device mask has a value of "00," then neither GPU is operational.

The operations in the push buffer 500, as illustrated in FIG. 5, are executed from right to left as indicated by time arrow 599. At time $t_0$, an IPGU setup operation 504 may be executed. The IGPU setup operation 504 may be utilized to configure the IPGU 128 to process batches of triangles through the modified rendering pipeline 400 of FIG. 4. Again, command stream 502 illustrates operations performed by the IGPU 128.

As shown, a process operation causes a particular GPU to process one or more batches of triangles through its respective rendering pipeline, as described above in FIGS. 2 and 4. Thus, if the process operation is performed by the IGPU 128, then the IGPU 128 processes each batch of triangles through the modified rendering pipeline 400 to determine which batches of triangles should be culled. If the process operation is performed by the DGPU 124, then the DGPU 124 processes the batches of triangles through the rendering pipeline 200, to the extent indicated by the corresponding bitstream 450, to render those triangles.

Therefore, at 506, the IGPU 128 processes frame "0" to determine which batches of triangles associated with frame 0 should be culled. At 508, the IGPU 128 writes bits into a bitstream corresponding to the visibility of the batches of triangles associated with frame 0, and the bitstream is written to system memory 104, which is accessible to both the IGPU 128 and the DGPU 124. In one embodiment, after the IGPU 128 has written bits corresponding to frame 0 into the bitstream, the IPGU 128 releases a semaphore 510 (at time $t_1$) to indicate that all bits corresponding to frame 0 have been written to system memory 104.

The DPGU may then acquire the semaphore at 554 (time $t_2$) before performing the read operation at 556. Again, in this fashion, the IGPU 128 always remains ahead in time of the DGPU 124 since the DGPU 124 cannot operate on a particular frame until the IGPU 128 has completed processing that frame. At 556, the DGPU 124 reads the bitstream 450 from system memory 104 that corresponds to the batches of triangles associated with frame 0. At 558 the DGPU 124 processes frame 0, performing full rendering with rendering pipeline 200 on the batches of triangles where the corresponding bits in the bitstream 450 indicate that the batches of triangles should not be culled and culling the batches of triangles where the corresponding bits in the bitstream 450 indicate that the batches of triangles should be culled.

While operations 556 and 558 are being performed by the DGPU 124, the IGPU 128 continues to process subsequent frames through the modified rendering pipeline 400 and write associated bits in the bitstream to system memory 104. Thus, as shown, the IGPU 128 processes frame 1 through the rendering pipeline 400 at 512 and then writes the corresponding bitstream to system memory 104 at 514. Once the bits have been written, the IGPU 128 releases a semaphore 516 (at time $t_3$) indicating that all the bits have been written to the bitstream for frame 1 and that the DGPU 124 can proceed to process frame 1.

At 560 (time $t_4$), the DGPU 124 acquires the semaphore for frame 1. At 562 the DGPU 124 reads the bits from the bitstream corresponding to frame 1. At 564, the DGPU 124 processes the batches of triangles that are not to be culled through the rendering pipeline 200, based on the bitstream. This interaction between the IGPU 128 and DGPU 124 continues for each frame, as indicated by the ellipses.

Finally, the IGPU 128 processes frame N through the rendering pipeline 400 at 518, writes the corresponding bitstream to system memory 104 at 520, and then releases a semaphore 522 (at time $t_5$) indicating that all the bits have been written to the bitstream for frame N and that the DGPU 124 can proceed to process frame N. At 566 (time $t_6$), the DGPU 124 acquires the semaphore for frame N. At 568 the DGPU 124 reads the bits from the bitstream corresponding to frame N. At 570, the DGPU 124 processes the batches of triangles that are not to be culled through the rendering pipeline 200, based on the bitstream.

One advantage of the systems and methods disclosed herein is that overall processing efficiency may be increased by not performing conventional rendering/shading operations on batches of triangles determined to be occluded or not visible. More specifically, by having the IGPU 128 perform limited operations to make culling determinations for different batches of triangles associated with a graphics object, overall processing efficiency may be increased since the DGPU 124 does not perform conventional rendering/shading operations on batches of triangles that the IGPU 128 determines should be culled.

While the foregoing is directed to embodiments of the present invention, other and further embodiments of the invention may be devised without departing from the basic scope thereof. For example, a computing device may be configured to perform the invention. Also, the discrete graphics processing subsystem may include multiple GPUs linked together to render graphics images in parallel. Also, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for fine-grained rendering predication, the method comprising:
    receiving a batch of triangles associated with a graphics object;
    processing the batch of triangles to determine only position information in a modified graphics rendering pipeline;
    determining, based on the position information, if the batch of triangles is to be culled; and
    writing a bit into a bitstream residing in a memory indicating whether the batch of triangles is to be culled.

2. The method of claim 1, wherein processing the batch of triangles comprises determining if the batch of triangles is outside a viewport.

3. The method of claim 1, wherein processing the batch of triangles comprises performing limited fragment shading operations to determine whether the batch of triangles fails a depth test.

4. The method of claim 1, wherein processing the batch of triangles comprises performing limited raster operations to determine whether the batch of triangles fails a stencil test.

5. The method of claim 1, wherein if the bit written into the bitstream indicates that the batch of triangles is to be culled, then further processing of the batch of triangles is bypassed.

6. The method of claim 5, wherein the further processing is performed in a discrete graphics processing unit that is configured to perform color-based and texture-based shading operations.

7. The method of claim 6, wherein the discrete graphics processing unit is further configured to render the batch of triangles for a frame even when the modified graphics rendering pipeline has not finished processing the batch of triangles for the frame.

8. The method of claim 1, wherein the batch of triangles is included in a second frame and a first batch of triangles included in a first frame is rendered by a graphics rendering pipeline implemented in a discrete graphics processor that performs color-based and texture-based shading operations while the batch of triangles is processed in the modified graphics rendering pipeline.

9. The method of claim 1, further comprising, prior to processing the batch of triangles, the bitstream is initialized to indicate that the batch of triangles is visible.

10. The method of claim 1, wherein a single bit is written to the bitstream for the batch of triangles and the batch of triangles includes at least two triangles.

11. A system, comprising:
    an interface that receives a batch of triangles associated with a graphics object; and
    an integrated graphics processor configured to:
        process the batch of triangles to determine only position information;
        determine, based on the position information, if the batch of triangles is to be culled, and
        write a bit into a bitstream residing in a memory indicating whether the batch of triangles is to be culled.

12. The system of claim 11, wherein the integrated graphics processor is further configured to:
    generate modified graphics primitives based on the vertex data; and
    determine that the batch of triangles is to be culled if no modified graphics primitives are generated.

13. The system of claim 11, wherein the integrated graphics processor processes the batch of triangles by determining if the batch of triangles is outside a viewport.

14. The system of claim 11, wherein the integrated graphics processor processes the batch of triangles by performing limited fragment shading operations to determine whether the batch of triangles fails a depth test.

15. The system of claim 11, wherein the integrated graphics processor processes the batch of triangles by performing limited raster operations to determine whether the batch of triangles fails a stencil test.

16. The system of claim 11, wherein if the bit written into the bitstream indicates that the batch of triangles is to be culled, then further processing of the batch of triangles is bypassed.

17. The system of claim 16, wherein further processing is performed in a discrete graphics processor that is configured to perform color-based and texture-based shading operations.

18. The system of claim 17, wherein the discrete graphics processor is further configured to render the batch of triangles for a frame even when the integrated graphics processor has not finished processing the batch of triangles for the frame.

19. The system of claim 11, wherein the batch of triangles is included in a second frame, and further comprising a discreet graphics processor configured to perform color-based and texture-based shading operations to render a first batch of triangles that is included in a first frame while the batch of triangles is processed by the integrated graphics processor.

20. The system of claim 11, wherein a single bit is written to the bitstream for the batch of triangles, and the batch of triangles includes at least two triangles.

* * * * *